United States Patent [19]

Wijnant et al.

[11] 4,091,520

[45] May 30, 1978

[54] PROCESS FOR MAKING A GASTIGHT PASSAGE

[75] Inventors: Petrus Leo Clemens Wijnant, 's-Hertogenbosch; Hendrik Jan Ijlstra, Egmond an der Hoef, both of Netherlands

[73] Assignee: Stichting Reactor Centrum Nederland, The Hague, Netherlands

[21] Appl. No.: 636,954

[22] Filed: Dec. 2, 1975

Related U.S. Application Data

[62] Division of Ser. No. 261,397, Jun. 9, 1972, Pat. No. 3,942,803.

[51] Int. Cl.² ............................................. B23P 19/00
[52] U.S. Cl. ......................................... 29/434; 29/445; 29/447; 29/456; 415/169 A; 415/214
[58] Field of Search ............... 29/456, 447, 445, 418, 29/434; 277/53; 415/169 A, 214

[56] References Cited

U.S. PATENT DOCUMENTS

| 1,376,043 | 4/1921 | Sherwood | 415/214 UX |
| 1,454,682 | 5/1923 | Layne | 415/169 A UX |
| 3,188,724 | 6/1965 | Bates et al. | 29/418 X |
| 3,313,172 | 4/1967 | Ulrich et al. | 29/456 X |
| 3,344,501 | 10/1967 | Kulzer | 29/456 X |

FOREIGN PATENT DOCUMENTS

| 18,077 | 9/1967 | Japan | 29/456 |

*Primary Examiner*—Charlie T. Moon
*Attorney, Agent, or Firm*—Cushman, Darby & Cushman

[57] ABSTRACT

A gastight seal for a rotating spindle or the like is made by tightly fitting an externally spirally ribbed element into a bore in another element and machining out that part of the element which projects inside the spiral rib so as to leave only the spiral rib flexed within the bore.

2 Claims, 4 Drawing Figures

PROCESS FOR MAKING A GASTIGHT PASSAGE

This is a division of application Ser. No. 261,397, filed June 9, 1972, now U.S. Pat. No. 3,942,803.

This invention relates to a method of making a gastight passage for a rapidly rotating spindle or other solid of revolution incorporated in a housing, which passage is embodied in a wall of this housing, the stationary part of this passage having at least one helical and/or spiral rib which, along with the adjacent wall of the housing or the surface of the solid of revolution, forms the boundary of at least one continuous thread of the screw or spiral.

The invention contemplates making a gastight seal for a rotating spindle or the like by tightly fitting an externally spirally ribbed element into a bore or passage in another element and machining out that part of the ribbed element which projects inwardly from the rib so as to leave only the rib fixed within the bore. Preferably the tight fit between the ribbed element and the bore is obtained by heating the element having the bore and/or chilling the ribbed element, inserting the ribbed element into the bore and allowing the element having the bore to cool and/or allowing the ribbed element to warm up.

According to a preferred embodiment of the invention the rib is fixed to a passage support which is in the form of a casting.

In this way the advantage is obtained that a manufacturing process is possible which lends itself well for large-series production of the passage. Moreover, it may often be essential to make the spiral in such a way that the depth of its thread and/or pitch is variable. This means that in most cases a casting process will be used for its production. Another reason for this is that the solid of revolution need not be cylindrical but may have any desired outer contour.

It has been found in practice that the casting, owing to contraction, adheres so firmly to the core that its removal is well-nigh impossible. In order to remedy this drawback the rib is fixed, according to the invention, by means of a contraction joint.

It is expedient for this purpose to form the rib itself also as a casting.

According to a special embodiment an inlet and an outlet channel respectively are provided in the solid of revolution that issues into the spiral passage. This embodiment provides the possibility of supplying gas to the interior of the solid of revolution or of removing gas from it. In many cases this solid of revolution will be a spindle. The gases can in that case be further conveyed through this spindle, for instance outwards, or to another part of the installation.

The production of the gastight passage is effected as follows:

The passage support is fabricated as a self-releasing casting, after which the part of it that is intended for the reception of the rib is turned to size to the form of a hollow cylinder by means of a chip-removing or machining operation. The rib is formed on an outer side of a second casting which is likewise self-releasing. The outer side of the latter is now machined to size by a chip-removing operation, to be subsequently fixed by contraction into the said hollow cylinder, after which the part of the second casting which protrudes into the rib is removed by a chip-removing operation.

Since the rib is on the outer side of the second casting, the spiral is at once releasable and can easily be removed from the casting mold. That is, it is easier to cast an external spiral rib than it is to cast an internal spiral rib.

Several embodiments of the invention are further elucidated by reference to the drawings in which.

Figure 1:
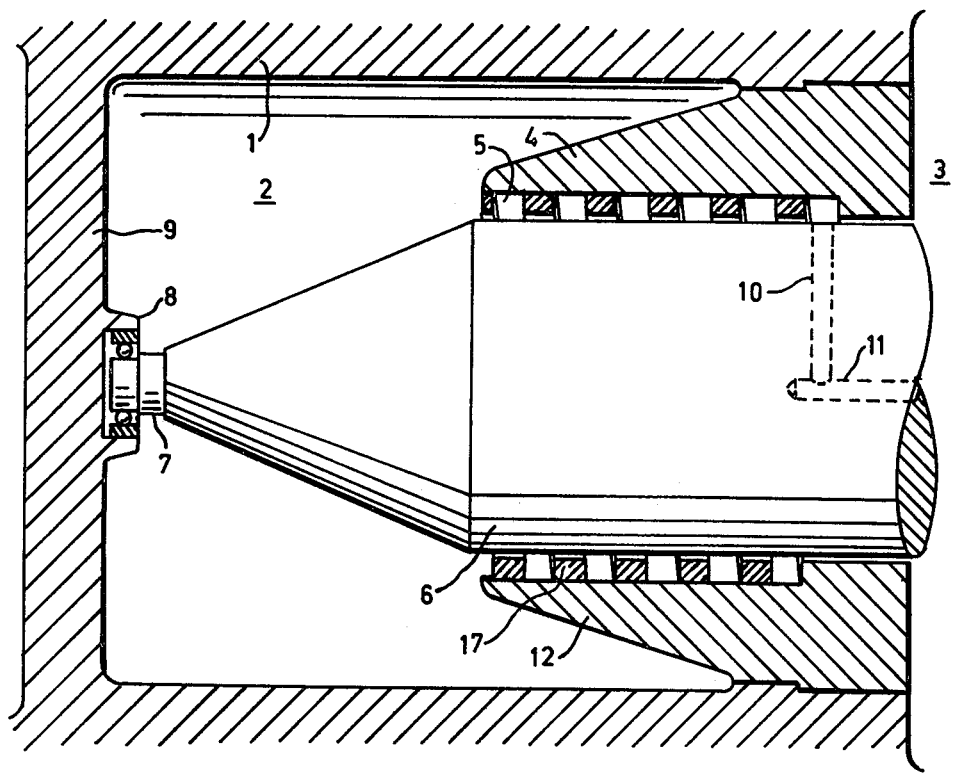
FIG. 1 is a vertical cross-section of a gastight passage embodying the principles of the invention.

In FIG. 1 a space 2 is provided inside a housing 1, from which gases need to be pumped away to space 3. This is effected in that a passage support 4 is provided which has a spiral screwthread 5. Inside this screwthread a spindle 6 is provided whose end 7 is pivoted in part 8 which is securely fixed to wall 9 of housing 1.

Figures 2, 3:
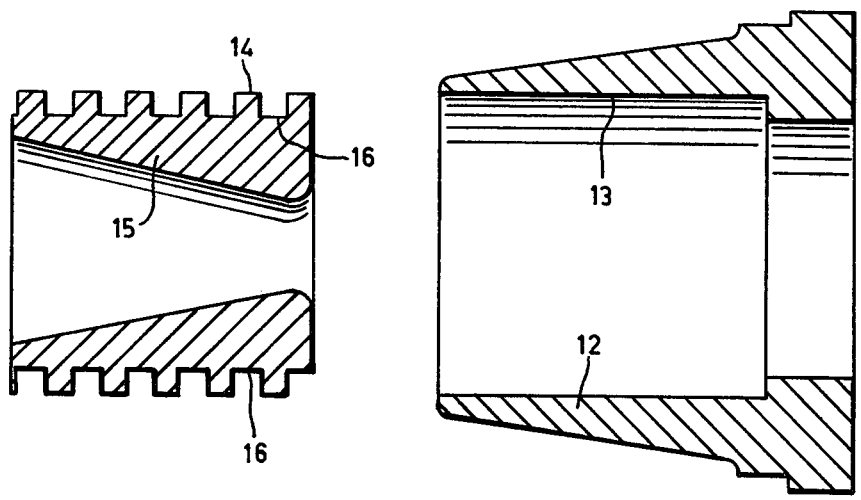
FIG. 2 is a vertical cross-section of the second casting before it has been placed in the passage support.
FIG. 3 is a vertical cross-section of a passage support.

The operation of this installation is as follows:

After the spaces 2 and 3 have been brought to a sufficiently low pre-vacuum and spindle 6 has begun to rotate, the gases are propelled out of space 2 through the spiral passage 5, provided care is taken that the direction of rotation of spindle 6 is such that the entrained current of gas is moved by spindle 5 from space 2 to space 3. The gas current in spiral 5 is known as a Knudsen-type current. In a current of this kind, molecules are continually brought into such contact with the moving outer jacket of spindle 6 that they receive a forward impulse in the direction of the spiral passage. The drawing shows at 10 that it is possible to provide spindle 6 with a radial outlet channel communicating with a central outlet channel 11, which may, for instance, likewise issue into space 3. In this construction the passage support 12 is first drilled cylindrically so that a smooth inner wall 13 is formed (see also FIG. 3). After this a second casting is made as illustrated in FIG. 2. After the latter has been machined to a precise cylindrical finish on its outer side 14, this second casting is introduced by contraction into the interior of the passage support 12, whereupon a firm connection is established in that 12 is heated while the casting 15 may possibly be cooled. After the contraction joint has been established, the portion of part 15 which lies within the diameter 16 is turned away entirely, so that only spiral 17 (FIG. 1) remains.

Figure 4:
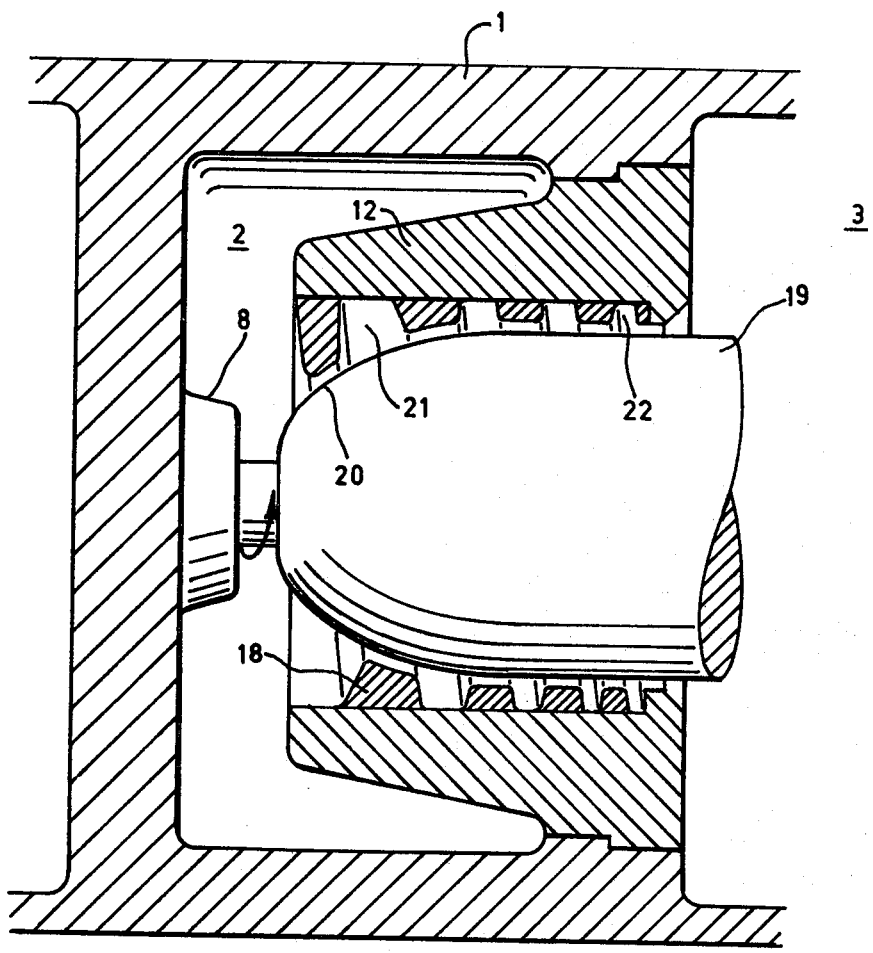
FIG. 4 is a variant of the FIG. 1 embodiment.

FIG. 4 illustrates a somewhat modified embodiment in which a spiral thread 18 is formed in the passage support 12, this spiral thread being so dimensioned that it is suitable for containing a solid of revolution 19 having an outer contour 20 which is curved. In this embodiment the spiral thread at the beginning 21 is much deeper and broader than it is near the end 22. In this way the pumping action of this spiral is greatly intensified.

We claim:

1. A method of making a spiral passageway between a rapidly rotating solid of revolution and a tubular support element comprising casting the tubular support element, machining a cylindrical bore within said element, casting a second element having a continuous spiral rib around its external surface, machining the outer surface of the rib to fit the bore in said support element, fixing said second element within the bore in said support element solely by a contraction fit, machining out that part of said second element which projects inside the rib so as to leave only said spiral rib fixed within said bore and mounting a rotatable body of revolution in said bore in closely relationship with said rib so that said rib and the exposed portion of the wall of the bore together with the surface of said body form at least one continuous spiral passageway.

2. A method of making a spiral passageway between a rapidly rotating solid of revolution and a tubular support comprising casting an element having a continuous spiral rib around its external surface, machining the outer surface of the rib to fit the bore in said tubular support, fixing said element within the bore in said tubular support solely by a contraction fit, and machining out that part of said element which projects inside the rib so as to leave only said spiral rib fixed within said bore.

* * * * *